United States Patent
Agarwal et al.

(10) Patent No.: US 11,433,638 B2
(45) Date of Patent: Sep. 6, 2022

(54) CREATING A TRUE THERMALLY CONDUCTIVE APPAREL USING INTRICATE THERMALLY FUNCTIONAL COATING AND THERMALLY CONDUCTIVE YARNS

(71) Applicant: The H.D. Lee Company, Inc., Greensboro, NC (US)

(72) Inventors: Dhruv Agarwal, Greensboro, NC (US); Yongxin Wang, Greensboro, NC (US); Josue Monge, Greensboro, NC (US)

(73) Assignee: The H.D. Lee Company, Inc., Greensboro, NC (US)

( * ) Notice: Subject to any disclaimer, the term of this patent is extended or adjusted under 35 U.S.C. 154(b) by 680 days.

(21) Appl. No.: 16/220,969

(22) Filed: Dec. 14, 2018

(65) Prior Publication Data

US 2019/0184673 A1    Jun. 20, 2019

Related U.S. Application Data

(60) Provisional application No. 62/598,817, filed on Dec. 14, 2014.

(51) Int. Cl.
*D06N 3/00* (2006.01)
*A41D 13/005* (2006.01)
(Continued)

(52) U.S. Cl.
CPC .............. *B32B 5/10* (2013.01); *A41D 13/005* (2013.01); *A41D 31/04* (2019.02); *B32B 5/022* (2013.01);
(Continued)

(58) Field of Classification Search
CPC ...... D06M 11/74; D06M 11/58; D06M 11/80; D06M 2101/32; D06N 3/0063;
(Continued)

(56) References Cited

U.S. PATENT DOCUMENTS 6,363,527 B1 * 4/2002 Biermann .......... A41D 13/0056
2/2.5
2003/0054141 A1 * 3/2003 Worley ................ D06N 3/0056
428/195.1
(Continued)

FOREIGN PATENT DOCUMENTS

EP          2314176 A2    4/2011
WO     2010129923 A2   11/2010
(Continued)

OTHER PUBLICATIONS

International Preliminary Report on Patentability for PCT/US2018/065724, dated Jun. 25, 2020, 8 pgs.
(Continued)

*Primary Examiner* — Larissa Rowe Emrich
(74) *Attorney, Agent, or Firm* — Womble Bond Dickinson (US) LLP

(57) ABSTRACT

Provided are garments that comprise thermally-conductive materials, the materials comprising a heat-collecting coating disposed on a fibrous base material having a thermally-conductive additive dispersed within. Also provided are methods of fabricating thermally-conductive garments.

21 Claims, 5 Drawing Sheets

(51) Int. Cl.
  *A41D 31/04* (2019.01)
  *D06M 23/08* (2006.01)
  *D06M 11/80* (2006.01)
  *D06M 11/58* (2006.01)
  *D06M 11/74* (2006.01)
  *D06M 101/32* (2006.01)
  *B32B 5/10* (2006.01)
  *B32B 5/02* (2006.01)
  *A41D 31/12* (2019.01)
  *D06M 101/06* (2006.01)
  *A41B 1/08* (2006.01)
  *A41D 1/06* (2006.01)

(52) U.S. Cl.
  CPC ............. *B32B 5/024* (2013.01); *B32B 5/026* (2013.01); *D06M 11/58* (2013.01); *D06M 11/74* (2013.01); *D06M 11/80* (2013.01); *D06M 23/08* (2013.01); *D06N 3/0006* (2013.01); *D06N 3/0063* (2013.01); *A41B 1/08* (2013.01); *A41D 1/06* (2013.01); *A41D 31/12* (2019.02); *B32B 2262/0269* (2013.01); *B32B 2262/062* (2013.01); *B32B 2262/106* (2013.01); *B32B 2307/302* (2013.01); *B32B 2313/02* (2013.01); *B32B 2313/04* (2013.01); *B32B 2317/10* (2013.01); *B32B 2317/18* (2013.01); *B32B 2437/00* (2013.01); *D06M 2101/06* (2013.01); *D06M 2101/32* (2013.01); *D06N 2209/06* (2013.01); *D06N 2209/062* (2013.01); *D06N 2211/10* (2013.01)

(58) Field of Classification Search
  CPC ........... D06N 2211/10; D06N 2209/06; D06N 2209/062; D06N 3/0006; D06N 3/0056; D06N 3/0059; D06N 3/0068; A41D 13/005; A41D 13/0053; A41D 13/0056; A41D 13/0051
  See application file for complete search history.

(56) References Cited

U.S. PATENT DOCUMENTS

| 2014/0079920 | A1 | 3/2014 | Blakely | |
| 2014/0124176 | A1* | 5/2014 | Zhamu | F28F 21/02 165/133 |
| 2015/0106992 | A1* | 4/2015 | Blakely | A41D 13/0056 2/69 |
| 2016/0374411 | A1* | 12/2016 | Brooks | A61F 7/007 165/104.21 |

FOREIGN PATENT DOCUMENTS

| WO | WO-2010129923 A2 * | 11/2010 | ............ A47G 9/086 |
| WO | 2013169413 A1 | 11/2013 | |
| WO | 2015051370 A2 | 4/2015 | |
| WO | 2017000017 A1 | 5/2017 | |
| WO | WO-2017129663 A1 * | 8/2017 | ......... A41D 13/0051 |
| WO | 2017184798 A1 | 10/2017 | |

OTHER PUBLICATIONS

International Search Report and Written Opinion for Application No. PCT/US2018/065724; dated Apr. 12, 2019; 14 pages.

* cited by examiner

CREATING A TRUE THERMALLY CONDUCTIVE APPAREL USING INTRICATE THERMALLY FUNCTIONAL COATING AND THERMALLY CONDUCTIVE YARNS

RELATED APPLICATION

The present application claims priority to and the benefit of U.S. patent application No. 62/598,817, "Creating A True Thermally Conductive Apparel Using Intricate Thermally Functional Coating And Thermally Conductive Yarns" (filed Dec. 14, 2017), the entirety of which application is incorporated herein by reference in its entirety for any and all purposes.

TECHNICAL FIELD

The present disclosure relates to the fields of garments and thermally conductive fabrics.

BACKGROUND

There is an increasing interest in high-performance fabrics that can help users regulate their temperature. In some instances (e.g., during exercise), the user may desire a garment that can help cool the user. In other cases, a user may seek a garment that retains heat.

To date, moisture-wicking materials have attracted significant commercial interest because of their ability to keep their users dry in warm and/or humid environments and to keep users relatively dry during periods of physical activity. Such moisture-wicking materials, however, function by transporting moisture (e.g., sweat) and heat contained in the moisture away from the wearer, and the material itself only conducts a very small amount of the user's heat away from the user.

At present, even though there can be a significant amount of contact area between a user's skin and their garments, it has been estimated that only about 3% of a user's heat is transferred away by conduction. Thus, there is a long-felt need for garments capable of creating and/or maintaining a microclimate for the thermal comfort of their users, e.g., by integrating heat transfer by conduction into garments capable of transporting a user's heat away from the user.

SUMMARY

As set forth in the present disclosure, with a heat transfer coating, body heat can be conducted away more quickly. During this conduction, garment temperature also changes, which temperature difference can cause enhanced natural convection, resulting in extra heat dissipation and cooling sensation.

In meeting the long-felt needs described above, the present disclosure first provides garments, a garment comprising: a fibrous textile base having a first side characterized as being user-facing, a second side, and a thickness defined therebetween, the fibrous textile base comprising at least one thermally-conductive additive disposed within the fibrous textile base; and a first region of heat-collecting coating disposed on the first side of the fibrous textile base, the heat-collecting coating optionally comprising at least one thermally-conductive additive, the heat-collecting coating optionally comprising one or more colorants and the heat-collecting coating optionally being patterned, the thermally-conductive additive being disposed so as to place the heat-collecting coating into thermal communication with the second side of the fibrous textile base. (Such a garment may optionally comprise a coating disposed on the first side of the fibrous textile base.)

Also provided are methods, comprising: with a fibrous textile base having a first side, a second side, and a thickness defined therebetween, the fibrous textile base comprising at least one thermally-conductive additive disposed within the fibrous textile base; disposing a first region of heat-collecting coating on the first side of the fibrous textile base, the thermally-conductive additive being disposed so as to place the heat-collecting coating into thermal communication with the second side of the fibrous textile base.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various aspects discussed in the present document. In the drawings.

DETAILED DESCRIPTION OF ILLUSTRATIVE EMBODIMENTS

Figure 1:
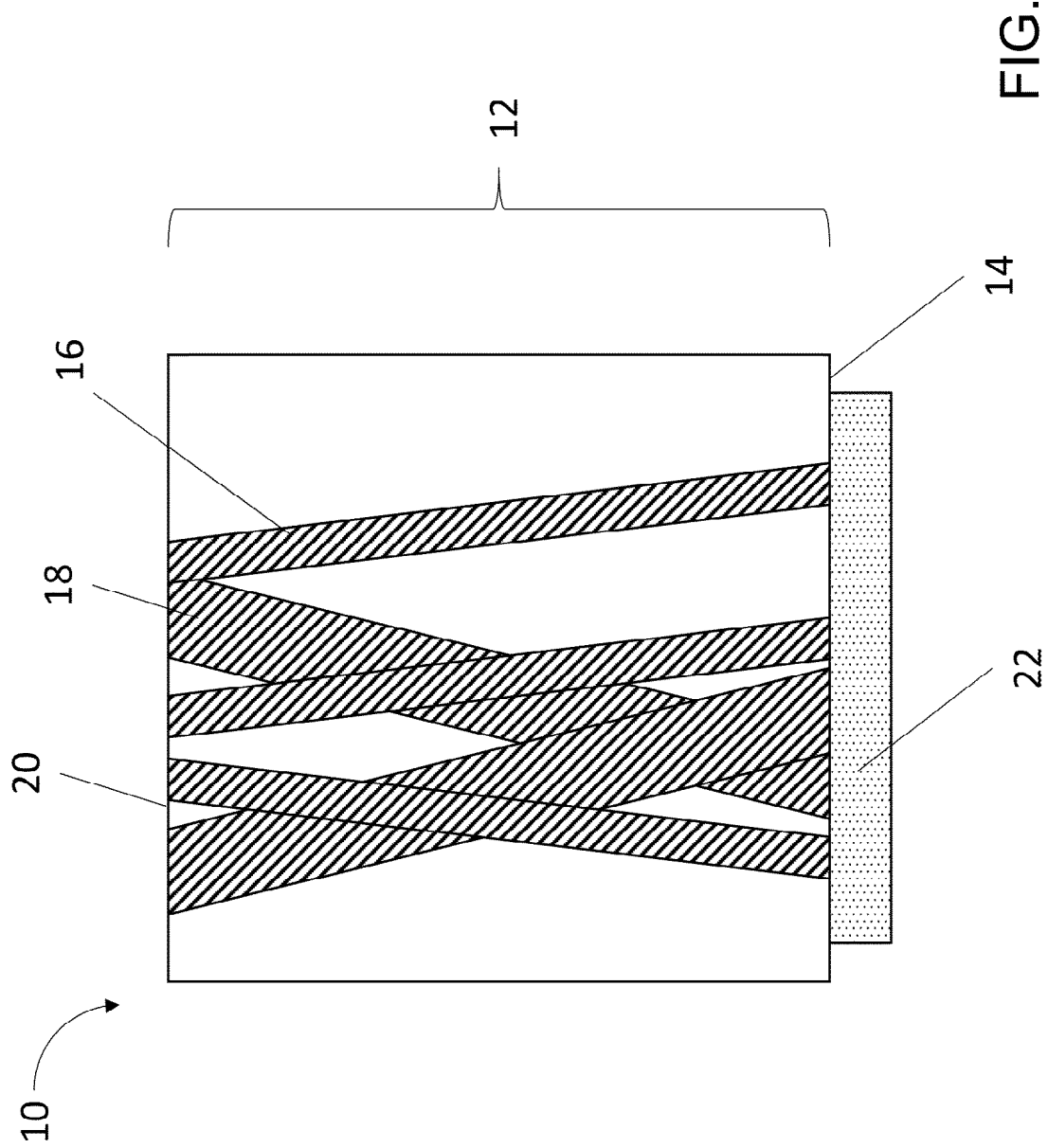
FIG. 1 provides a cutaway view of a garment according to the present disclosure.

The present disclosure may be understood more readily by reference to the following detailed description of desired embodiments and the examples included therein.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing. All publications, patent applications, patents and other references mentioned herein are incorporated by reference in their entirety. The materials, methods, and examples disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Numerical values in the specification and claims of this application, particularly as they relate to polymers or polymer compositions, oligomers or oligomer compositions, reflect average values for a composition that may contain individual polymers or oligomers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value.

The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

Further, the term "comprising" should be understood as having its open-ended meaning of "including," but the term also includes the closed meaning of the term "consisting." For example, a composition that comprises components A and B may be a composition that includes A, B, and other components, but may also be a composition made of A and B only. Any documents cited herein are incorporated by reference in their entireties for any and all purposes.

Figures

FIG. 1 provides a cross-sectional view of a section of a garment 10 according to the present disclosure. As shown in FIG. 1, garment section 10 may include a fibrous textile base 12. The textile base 12 may have a first side 14 that faces the wearer of the garment and a second side 20. The first side 14 of the garment may include a heat-collecting coating 22 disposed thereon. The fibrous textile base 12 may include fibers 16 and 18; as shown. The fibers of the base may be of the same diameter, but this is not a requirement; as shown, the fibers may also be of different diameters. As shown, the fibers 16 and 18 of the fibrous base may place the heat-collecting coating 22 into thermal communication with the second side 20 of the garment. It should be understood that a garment according to the present disclosure may include a second coating (not shown) disposed on the second side 20 of the garment, which second coating may be heat-collecting in nature. As described elsewhere herein, the second coating may be of the same material as the first coating, though this is not a requirement.

As described elsewhere herein, the fibers of the fibrous base may themselves include a thermally-conductive additive, e.g., an additive disposed onto or even within the fibers. In some embodiments, the thermally-conductive additive is otherwise disposed within the base, e.g., between the fibers so as to form a thermal pathway between the first and second side of the fibrous base.

Figure 2:
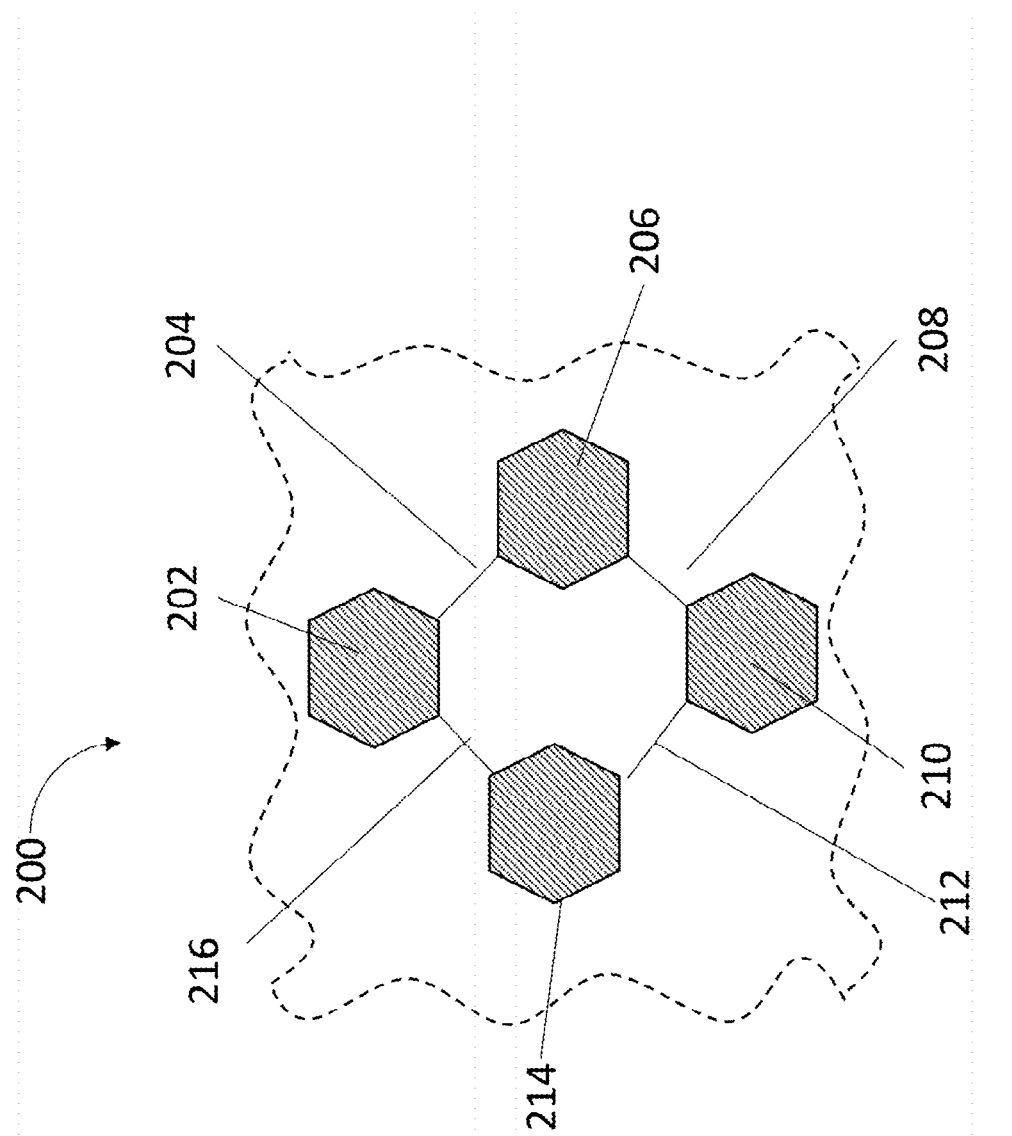
FIG. 2 provides a view of exemplary interconnected features on a user-facing side of a garment according to the present disclosure.

FIG. 2 provides a view of interconnected features in a garment swatch 200 according to the present disclosure. As shown, hexagon features 202, 206, 210, and 214 are connected by thermally conductive traces 204, 208, 212, and 216. Although the features are shown in FIG. 2 as hexagonal, this is illustrative only, as features may be of virtually any shape, e.g., circles, dots, and other polygons. It should be understood that the user-facing surface of a garment may include grooves, ridges, channels, or other features that facilitate heat or moisture transfer. In some embodiments, the user-facing surface of a garment may include a web or other network of interconnected features (e.g., the linked hexagons of FIG. 2); such interconnections may facilitate the transfer of thermal energy. A thermally conductive trace may be made from the same material as one or both of the features that the trace may connect to one another.

The user-facing surface of a garment according to the present disclosure may, as described elsewhere herein, include a coating. The coating on the user-facing surface of the garment may be the same or different from a coating on the other surface of the garment. It should be understood that the term "coating" as it is user herein does not require an uninterrupted layer, as a coating may comprise discrete features (e.g., dots, hexagons, and the like) that may be connected to one another. A connection between two features may be formed of the same material as the features, but this is not a requirement, as a connection between two features may be formed of a material that is different from the features that it connects. It should also be understood that a coating may be present as, e.g., a perforated layer.

Figure 3:
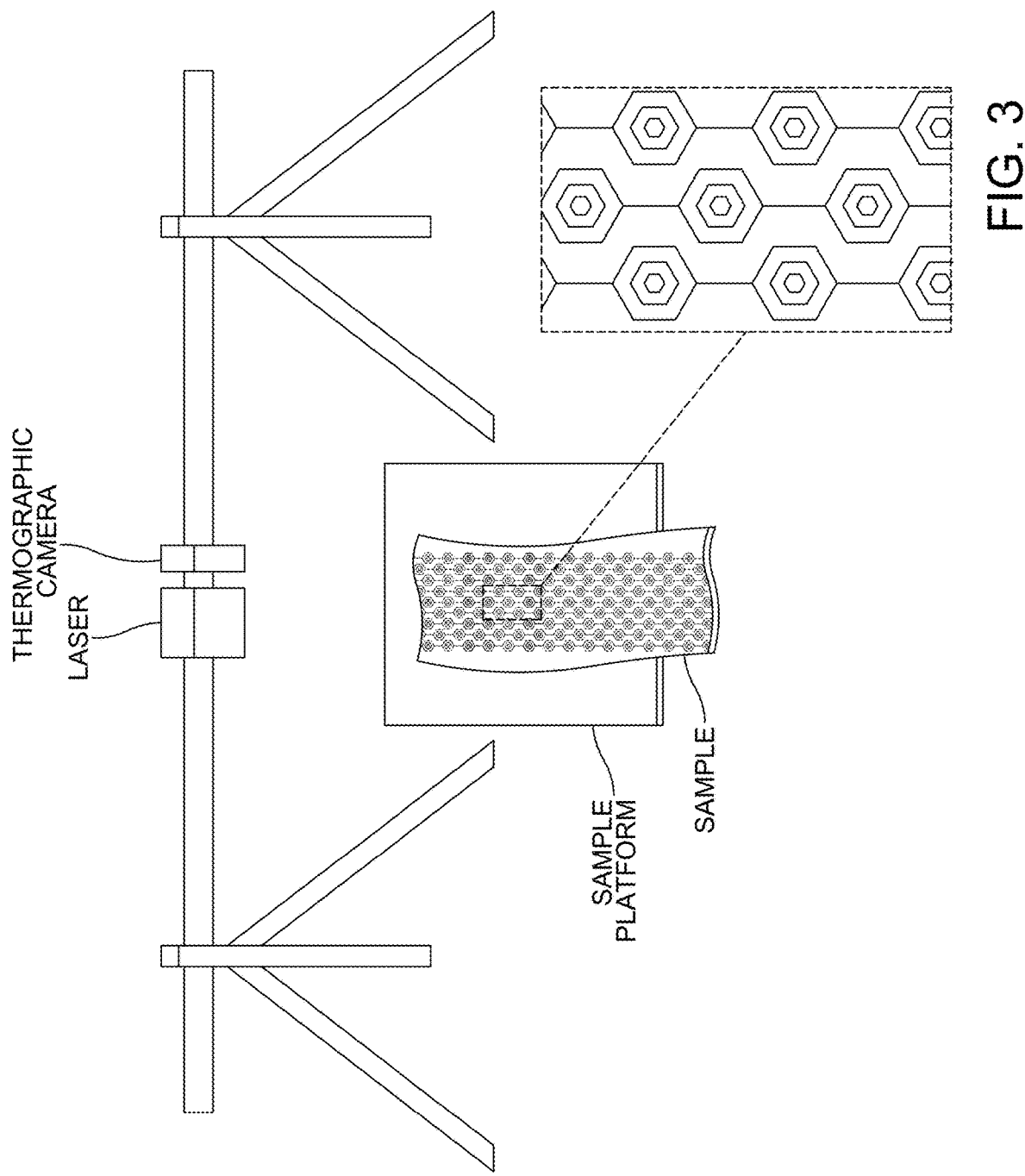
FIG. 3 provides a depiction of a testing setup.

FIG. 3 provides a schematic view of an exemplary setup used for evaluating the thermal performance of materials according to the present disclosure. The setup included a laser configured to lase a sample disposed beneath the laser and also included a thermometric camera used for thermal imaging of the sample. As shown, a sample (in this case, a sample that comprised linked hexagons of thermally conducting material) was disposed atop a sample platform.

Figure 4:
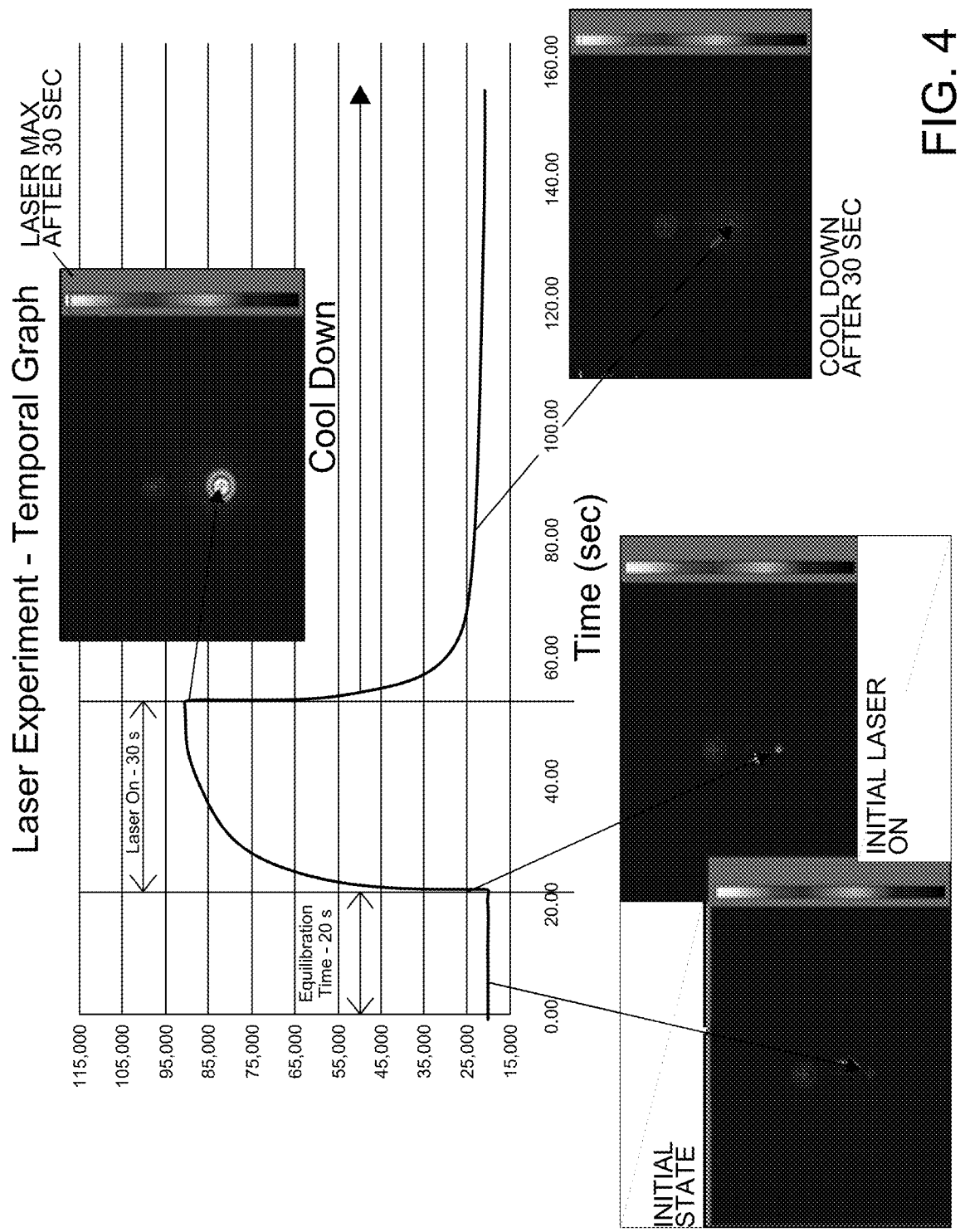
FIG. 4 provides data from a test of an exemplary sample according to the present disclosure.

FIG. 4 provides exemplary data from a thermal evaluation of material according to the present disclosure. As shown the sample temperature was initially allowed to equilibrate for 20 seconds, which state is shown by the "Initial State" inset image from the thermometric camera. The laser was then turned on for 30 seconds, which—as shown—increased the sample temperature from time=20 seconds to time=50 seconds. The "Initial Laser On" inset image shows a thermal image of the sample when the laser was initially turned on.

At 30 seconds, the sample reached its maximum temperature; inset image "Cool Down" shows a thermal image of the sample as the laser was turned off. After the laser was turned off, the sample was allowed to cool for 30 seconds. As shown, the change in temperature vs. time was fairly rapid beginning with when the laser was turned off. After 30 seconds of cool down, another thermal image ("Cool Down After 30 Sec") was taken, showing that the sample was resuming its earlier equilibration temperature.

Figure 5:
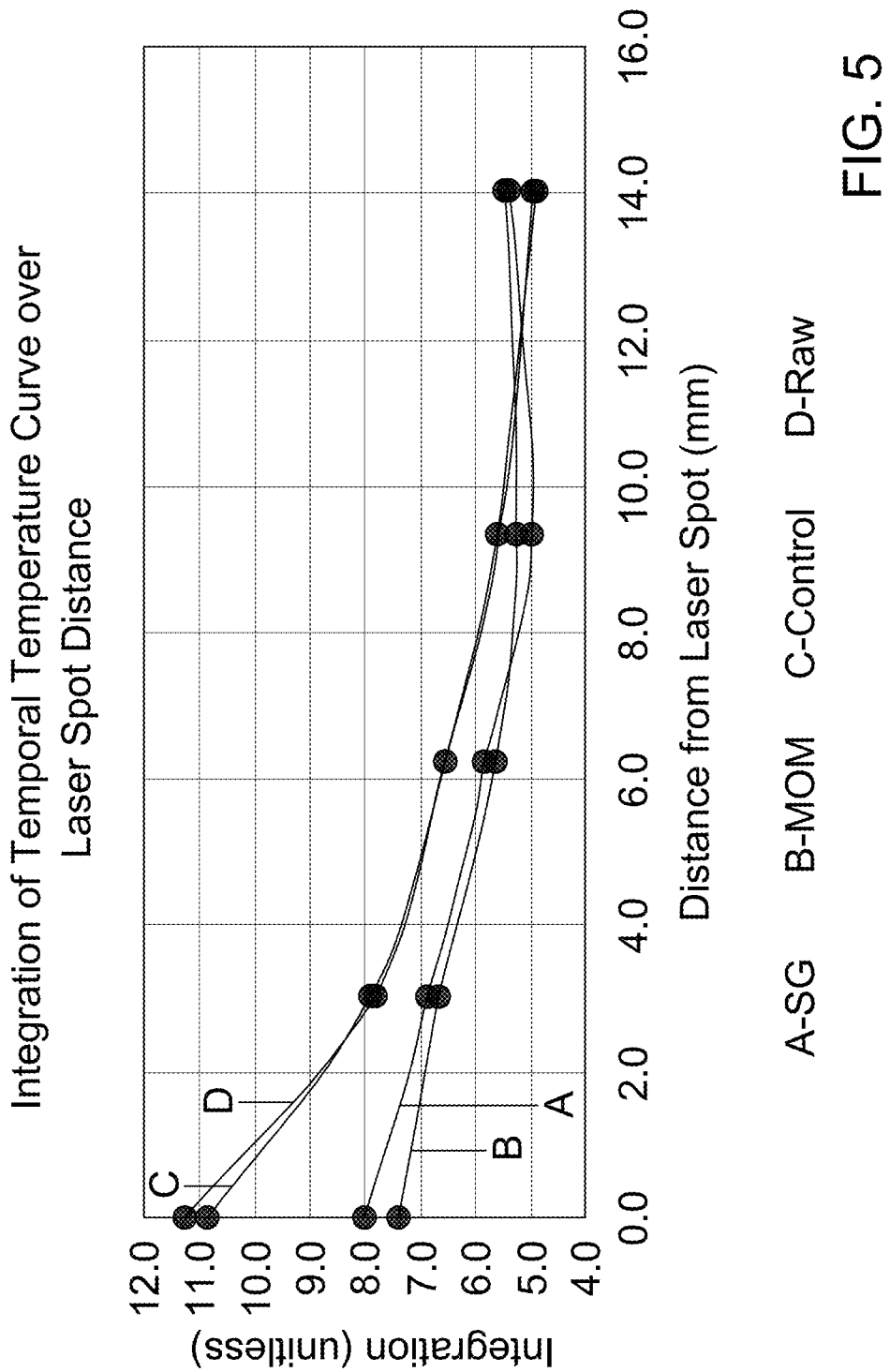
FIG. 5 provides additional data from tests of exemplary samples according to the present disclosure.

FIG. 5 provides exemplary data showing the integration of the temporal temperature curve over laser spot distance. As shown, at each tested distance from the laser spot (as well as cumulatively), the disclosed technology with a performance additive (i.e. SG and MOM) dissipated/distributed more heat than the printed control and raw fabric.

Additional Disclosure

The following disclosure is illustrative only and does not necessarily limit the present disclosure or the appended claims.

The disclosed garments can include a hydrophilic agent disposed on and/or in a portion of the garment. Such a hydrophilic agent can provide an improved moisture management benefit to the overall garment, e.g., when a coating (which can be termed an "ink") is applied onto the surface of the garment. The hydrophilic agent can be comprised within a coating of the garment. Without being bound to any particular theory, a hydrophilic agent can aid in both thermal conduction, as well as moisture transport in the garment. A garment according to the present disclosure can also itself can be intrinsically a moisture management product (e.g., constructed with wicking fibers, wicking fabric finish, etc.)

A hydrophilic agent can comprise, e.g., silicone (e.g., micronized silicone), siloxane (e.g., polyether/alkyl siloxane), siloxane derivatives, polyglycols with either hydroxyl to amine terminal groups.

Hydrophilic polymers/molecules, e.g., those that contain polar or charged functional groups (e.g, —OH, COO—, and others), rendering them soluble in water, can be used as hydrophilic agents. Example such acrylic polymers include acrylic acid, acrylamide, as well as maleic anhydride polymers and copolymers. Example amine-functional polymers include allylamine, ethyleneimine, oxazoline, and other polymers containing amine groups in their main- or side-chains. Starches and cellulose can also be used as hydrophilic agents. As described elsewhere herein, a hydrophilic agent can be in the coating/ink and/or the substrate.

Furthermore, phase change materials (also known as PCMs) can be incorporated into or onto the disclosed garments. The disclosed garments can include a PCM disposed on and/or in a portion of the garment. Such a PCM can provide an improved moisture management or thermal management benefit to the overall garment, e.g., when a coating (which can be termed an "ink") is applied onto the surface of the garment. The PCM can be comprised within a coating of the garment. Exemplary PCMs include, e.g., paraffins, carbohydrate-based materials and/or lipid-derived materials, and the like.

Example

In a test of a sample according to the present disclosure, measurements were performed to assess the efficiency of cooling technology when exposed to laser radiation. In this test, the sample was irradiated by a 5 mW (violet) laser for 30 seconds, with temperature changes of the affected region collected via thermographic camera, as shown by the set-up in FIG. 3.

The test fabric used in this example was composed of 69% cotton/15% rayon/13% polyester/3% spandex in a 3/1 woven structure. (It should be understood that the disclosed technology is substrate agnostic, and has application and effectiveness with essentially any substrate.)

The ink used in this example was made from a polyurethane base with the following additions:

I. Boron nitride (30% (w/v), Momentive ("MOM") boron nitride powder grade PCTP16)

II. Boron nitride (25% (w/v), Saint Gobain ("SG") boron nitride powder grade HCP.

Regarding the printed pattern in the example fabric, the specific hexagonal design used in these test samples is shown in FIG. 3. The hexagons had a width of 13 mm and a side length of 7 mm. The width of the trace connecting connected hexagons was 1 mm.

In this test, the sample had 20 seconds of equilibration, followed by 30 seconds of continuous laser exposure. Following laser exposure, the laser was turned off and the heated sample cooled down for 2 minutes, during which the cooling performance of the sample was assessed.

The results are shown in FIG. 4. The maximum temperature was obtained and compared for each temporal graph after 30 seconds of laser exposure. Without being bound to any particular theory, the more efficient the technology is at cooling (via conduction), the lower the maximum temperature. When comparing the maximum temperatures of each system (after 30 seconds of irradiation), the printed technology with the performance additive (i.e., SG and MOM) dissipates more heat from the laser spot, compared to both ink base and raw fabric.

| Laser Spot | Raw | Print - Con. | Print - SG | Print - MOM |
| --- | --- | --- | --- | --- |
| AVG (° C.) | 102.97 | 87.79 | 62.64 | 46.51 |
| % CV (4x) | 1% | 1% | 3% | 7% |
| %Δ (Con.) | +19% | 0% | −28% | −46% |

When analyzing temperature-time curves for this experiment, one can qualitatively compare (in-plane) heat transfer efficiencies of the printed technology. This is done by integrating temperature-temporal plots and comparing the integration values over the distance from the laser spot; just as in the maximum temperature analysis, the lower the value, the more heat is transferred away from the laser spot/source at a particular distance. As shown in FIG. 5, at each tested distance (as well as cumulatively), the disclosed technology with the performance additive (i.e. SG and MOM) dissipated/distributed more heat than the printed control and raw fabric.

EXEMPLARY EMBODIMENTS

The following embodiments are illustrative only and do not necessarily limit the present disclosure or the appended claims.

Embodiment 1

A garment, comprising: a fibrous textile base having a first side characterized as being user-facing, a second side, and a thickness defined therebetween, the fibrous textile base (optionally) comprising at least one thermally-conductive additive disposed within the fibrous textile base; and a first region of heat-collecting coating disposed on the first side of the fibrous textile base, the heat-collecting coating optionally comprising at least one thermally-conductive additive, the heat-collecting coating optionally comprising one or more colorants and the heat-collecting coating optionally being patterned, the thermally-conductive additive being disposed so as to place the heat-collecting coating into thermal communication with the second side of the fibrous textile base.

Optionally, the first side (i.e., the user-facing side) of a garment may also include a thermally-conductive coating that faces the user. Such a user-facing coating may be the same or different as the coating on the second surface of the garment.

The fibrous textile base is suitably of a thickness suitable for garment manufacture; suitable thicknesses will be known to those of skill in the art and may depend on the type of garment. The thermally-conductive additive may be disposed within the fibrous textile base by, e.g., incorporating the additive directly into the fibers of the base when the fibers are formed, e.g., by mixing the additive with the base material of the fibers and then extruding fibers of that base material such that the additive is already incorporated into the fibers.

The additive may be disposed onto the outside of the fibers during or even after fiber extrusion, e.g., by immersing the fibers into a solution into which the additive has been dispersed. Such a solution may include, e.g., an adhesive or other material to facilitate disposition of the additive onto the fibers. An additive may also be sprayed, printed, knife-coated, or otherwise deposited onto the fibers. As one non-limiting example, thermally-conductive wires or fibers (e.g., copper fibers or copper wires) may be incorporated into the fibrous textile base. The additive may be, e.g., embedded into or onto fibers while the fiber is being spun or extruded. The additive may be in particulate form, but may also be in the form of fibers, wires, platelets, or other elongate forms. A binder may be used to secure or otherwise facilitate the association of the additive with the fibrous textile base.

In some embodiments, the fibrous textile base—including any additives but excluding any coatings formed on the base—may have a through-plane thermal conductivity in the range of, e.g., about 0.05 to 5.0 W/m*K, as measured using a hot disk transient plane method (e.g., TPS 2500S, Thermtest).

The additive may be present at such a level that there is sufficient additive to place one surface of the garment into thermal communication with the other surface of the garment. In some embodiments, there is sufficient additive at one or more locations of the garment so as to provide a physically continuous pathway from one surface of the garment to the other surface of the garment.

As described, the garment may also include a heat-collecting coating (also termed a "heat sink," in some instances). The heat-collecting coating may be disposed on the first surface of the garment, which surface is suitably the user-facing surface of the garment, e.g., the inside surface of a sleeve. The heat-collecting coating may include one or more thermally-conductive additives; suitable additives are described elsewhere herein. A garment according to the present disclosure may include (e.g., as an additive or as a coating) a comparatively high heat capacity material, such as volcanic rock, soapstone, marble, granite, or textile composites with carbon nanotubes. Other such heat-collecting materials include, e.g., metals (including metal alloys and metal oxides), ceramics, phase-change materials (PCMs), polymeric materials, gels (e.g., encapsulated or otherwise contained), and the like. Without being bound to any particular theory, this can achieve a warming effect for the user. Graphene oxide is also considered an especially suitable material for inclusion in the presently disclosed garments, e.g., as a coating or as an additive. Before the body begins to sweat, most of the body excess heat is evacuated by radiation, and graphene oxide (1) has the capability to absorb radiation (so as to keep the user warm); and (2) has the ability to dissipate the heat outside (to cool down) with both far-infrared emission and convection mechanism with air movement. In this way, graphene oxide (as a non-limiting example) allows for a dual mechanism that enables thermal regulation.

A coating may also include, in addition to the thermally-conductive additive, one or more binders. Suitable binders include, e.g., acrylics, (poly)urethanes, and the like. Sodium alginate, polyvinylidene fluoride, and carboxymethyl cellulose are all considered suitable binder materials. A binder may impart flexibility to the coating such that the coating may bend with the user's movements.

In some embodiments, the binder is present at from about 40 to about 90 wt % of the heat-collecting coating, e.g., from about 40 to about 90 wt %, from about 45 to about 85 wt %, from about 50 to about 80 wt %, from about 55 to about 75 wt %, or even from about 60 to about 70 wt %. Binders that maintain flexibility under typical clothing use (e.g., bending, stretching, folding) are considered especially suitable. A heat-collecting coating may include one, two, or even more different kinds of additives. Likewise, a heat-collecting coating may include one, two, or even more different kinds of binders.

Without being bound to any particular theory, a binder may impart flexibility to the heat-collecting coating so as to allow the coating to bend or otherwise flex with the movements of the garment wearer. A coating may have a through-plane thermal conductivity in the range of from, e.g., 0.05 W/m*K to about 5.0 W/m*K, as measured using a hot disk transient plane method (e.g., TPS 2500S, Thermtest). A coating may have an in-plane thermal conductivity in the range of from, e.g., 0.005 W/m*K to about 4.0 W/m*K (e.g., from about 0.005 to about 4, from about 0.01 to about 3.8, from about 0.1 to about 3.1, from about 0.5 to about 2.7, from about 0.9 to about 2.8, or even from about 1.3 to about 1.9 W/m*K), as measured using a hot disk transient plane method (e.g., TPS 2500S, Thermtest). The heat-collecting coating may be disposed such that the thermally-conductive additive of the base places the heat-collecting coating into thermal communication with the second (i.e., the environment-facing) surface of the garment.

A garment according to the present disclosure may have a through-plane thermal conductivity in the range of from, e.g., 0.05 W/m*K to about 5.0 W/m*K (e.g., from about 0.05 to about 5.0, from about 0.1 to about 4, from about 0.3 to about 3.7, from about 0.5 to about 3, from about 0.7 to about 2, or even from about 1 to about 1.5 W/m*K), as measured using a hot disk transient plane method (e.g., TPS 2500S, Thermtest). A garment according to the present disclosure may have an in-plane thermal conductivity in the range of from, e.g., 0.005 W/m*K to about 4 W/m*K (e.g., from about 0.005 to about 4, from about 0.01 to about 3.8, from about 0.1 to about 3.1, from about 0.5 to about 2.7, from about 0.9 to about 2.8, or even from about 1.3 to about 1.9 W/m*K), as measured using a hot disk transient plane method (e.g., TPS 2500S, Thermtest).

Colorants may include, e.g., dyes, pigments, and the like. A colorant may be virtually any color, e.g., blue, green, white, red, purple, pink, and the like. A colorant may be black in some embodiments. A garment may include one, two, or more colorants. A dye may be fluorescent; a dye may also be thermochromic. A thermochromic dye may allow a user to, by inspection, determine whether their garment is absorbing or conducting heat.

A garment may also include grooves and/or ridges. Such features may be used to help transport (i.e., wick) moisture from the user.

A garment can also include a hydrophilic agent. (Such agents are described elsewhere herein.) Such an agent can be incorporated into/onto the textile base. Such an agent can also be incorporated into the coating.

Embodiment 2

The garment of Embodiment 1, wherein the fibrous textile base comprises a plurality of thermoplastic fibers, a plurality of rayon fibers, a plurality of cellulosic fibers, protein fibers, co-polymer fibers, aramid fibers, inorganic fibers (e.g., glass, basalt), carbon fibers, and the like, as well as any combination thereof. Thermoplastic fibers are considered especially suitable, although they are not required. Fibers and/or treatments that confer a moisture-wicking characteristic on the garment are considered especially suitable, as the disclosed technology is especially well-suited to activewear-type applications where the garment's user has particular need to remove heat before, during, or after physical activity.

Embodiment 3

The garment of Embodiment 2, wherein the thermoplastic comprises a polyester, a polyamide, a polypropylene, a polyethylene, an acrylic, a modacrylic, or any combination thereof, including copolymers and other blends. Polyester is considered an especially suitable thermoplastic for garments according to the present disclosure.

Embodiment 4

The garment of any of Embodiments 1-3, wherein the heat-collecting coating, the thermally-conductive additive, or both, comprises aluminosilicate (including modified aluminosilicates), graphene, graphene oxide, boron nitride, carbon nanofibers, carbon nanotubes, boron nitride, or any combination thereof. (Boron nitride may be in the form of micron, sub-micron or even nano-size particles. The morphology of nanosize particles may be tubes, platelets, or even sheets. Such particles may also be hexagonal crystalline particles.) Carbon nanotubes and boron nitride are both considered especially suitable additives.

The thermal conductivity of single-walled carbon nanotubes (SWCNT) has been estimated to be 3500 W/m*K. The thermal conductivity of multi-wall carbon nanotubes (MWCNT) has been estimated to be 3000 W/m*K; the thermal conductivity of a single layer of graphene has been estimated to be 5300 W/m*K, and the thermal conductivity of boron nitride has been estimated to be 300-600 W/m*K.

Still further thermally-conductive materials include, e.g., $Si_3N_4$, $Al_2O_3$, AlN, BN, SiC, alumina, and other thermally conductive particles. The thermal conductivities for metal/ metallic materials (e.g., Ti, Cr, Mo, W and their carbides) may be in the range of, e.g., 7-170 W/m*K, e.g., from about 7 to about 170, from about 10 to about 150, from about 20 to about 130, from about 30 to about 120, from about 40 to about 110, from about 50 to about 100, from about 60 to about 90, or even from about 70 to about 80 W/m*K.

Other suitable additives include, e.g., nanodiamonds, sapphire, wurtzite zinc oxide, ruby, aluminum oxide, and magnesium. Suitable additives can also include phase-changing additives, additives having particular infrared reflectance and/or absorption, and the like. Additives may be selected on a variety of criteria.

When comparatively high heat capacity materials are used as additives, they may provide better heat retention and warmth. Exemplary heat capacities for additives are, e.g., soapstone (1000 J/kg*deg. C.), marble (880 J/kg*deg. C.), granite (790 J/kg*deg. C.), and textile composites with carbon nanotubes (4500 J/kg*deg. C., in some cases). Jade may also be used as an additive. The heat capacity of an additive is suitably higher than the heat capacity of the textile base, and can be, e.g., from about 500 to about 5000 J/kg*deg. C., e.g., from about 500 to about 5000, from about 600 to about 4800, from about 700 to about 4600, from about 800 to about 4400, from about 1000 to about 4200, from about 1200 to about 4000, from about 1400 to about 3800, from about 1600 to about 3600, from about 1800 to about 3400, from about 2000 to about 3200, from about 2200 to about 3000, from about 2400 to about 2800, or even about 2600 J/kg*deg. C.

A variety of phase changing materials may be used as additives. Some examples include, e.g., paraffin, non-paraffin organics, and even hydrated salts. A phase change material may be integrated directly into the fabric of a garment according to the present disclosure, but may also be kept in a separate volume (e.g., a capsule or other containment feature) so as to be in thermal communication with the garment but not necessarily physical communication. Exemplary phase change materials include, e.g., PCM-PDR15P, PCM-OM18P, and PCM-HS22P, available from RGEES, LLC of Arden, N.C. Other exemplary phase-change materials may be found in Progress in Materials Science, Pielichowska et al., vol. 65, pp. 67-123 (August 2014), the entirety of which publication is incorporated herein for any and all purposes.

Materials having infrared reflectance and/or absorbance are also considered suitable additives. Metals (e.g., Al, Ag, Au) and metal oxides are considered suitable, as are IR-reflective pigments. As one example, material having reflectance in the range of from about 100 nm to about 2500 nm (and all intermediate values) is considered suitable, especially for applications where solar reflectance is desired. Reflectance of from about 1000 to about 2500 nm is also suitable, e.g., for applications where reflectance of human body infrared heat is desired.

A garment according to the present disclosure may include two or more different types of thermally-conductive additives. As one example, the heat-collecting coating may include the same thermally-conductive additive that is disposed within the fibrous textile base. As another example, the heat collecting coating may include one type of additive, while the fibrous textile base includes a different type of additive.

Embodiment 5

The garment of any of Embodiments 1-4, wherein the heat-collecting coating comprises a plurality of features placed into thermal communication with one another. As one example, the coating may comprise a plurality of lines that intersect with one another, e.g., in a cross-hatched pattern. In another example, the coating may include a plurality of circles that touch or even overlap with one another.

In still another example, the coating may comprise a plurality of dots or other non-linear features that are connected to one another by lines or other traces, e.g., in a nodal-network type of arrangement. Without being bound to any particular theory, the connections between separate features facilitate heat transfer within the coating, which in turn leads to heat transfer from the coating through the base.

The relative density of features may vary with location along the coating. As one example, a coating may include a comparatively high density of interconnected dots in one region, and then include a comparatively lower density of interconnected dots in another region of the coating. As one example, a garment may have a relatively higher density of interconnected features in a location where a user may produce more heat (e.g., neck, back of knee) and a relatively lower density of interconnected features in a location where a user may produce relatively less heat (e.g., forearms).

Embodiment 6

The garment of any of Embodiments 1-5, wherein the garment comprises a second region of a heat-collecting coating, the heat-collecting coating of the second region differs from the heat-collecting coating of the first region in composition, in pattern, in thickness, or any combination thereof. As one non-limiting example, a coating might include a first region that comprises interconnected dots formed from nanotubes disposed in a binder and a second region that comprises interconnected circles formed from metallic flakes disposed in a different binder, with the first and second regions being physically connected to one another.

Embodiment 7

The garment of any of Embodiments 1-6, wherein the thermally-conductive additive comprises aluminosilicate (including modified aluminosilicates), graphene, boron nitride, carbon nanotubes, metals, or any combination thereof. Carbon nanotubes are also suitable additives, as are graphene oxide, metals and metal oxides.

Embodiment 8

The garment of Embodiment 7, wherein the thermally-conductive additive comprises graphene oxide.

Embodiment 9

The garment of any of Embodiments 1-8, wherein the garment has (a) a through-plane thermal conductivity of from about 0.1 W/m*k to about 5.0 W/m*K as measured using a hot disk transient plane method (e.g., TPS 2500S, Thermtest), (b), an in-plane thermal conductivity of from about 0.005 W/m*K to about 4 W/m*k, or both (a) and (b).

Embodiment 10

The garment of any of Embodiments 1-9, wherein the thermally conductive additive is present at from about 0.5 to about 5 wt % as measured against the weight of the fibrous textile base. The additive may be present at, e.g., from about 0.5 to about 5 wt % of the fibrous textile base, or from about 1 to about 4.5 wt % of the weight of the fibrous textile base, or from about 1.5 to about 4 wt % of the weight of the fibrous textile base, or from about 2 to about 3.5 wt % of the fibrous textile base, or even from about 2.5 to about 3 wt % of the fibrous textile base.

Embodiment 11

The garment of any of Embodiments 1-10, wherein the heat-collecting coating represents from about 0.01 to about 40% of the surface area of the user-facing surface of the garment. As one example, if the user-facing surface of a headband is 50 $cm^2$, the coating may occupy, e.g., 1 to 10 $cm^2$ of that surface.

A heat-collecting coating may be disposed on, e.g., from about 0.01 to about 40% of the surface area of the user-facing surface of the garment, or from about 0.1 to about 35% of the surface area of the user-facing surface of the garment, or from about 1 to about 30% of the surface area of the user-facing surface of the garment, or from about 5 to about 25% of the surface area of the user-facing surface of the garment, or from about 10 to about 20% of the surface area of the user-facing surface of the garment, or even about 15% of the surface area of the user-facing surface of the garment. A heat collecting coating may also be disposed on greater than 40% of the surface area of the user-facing surface of the garment, e.g., from about 40 to about 99% of the surface area of the user-facing surface, from about 45 to about 90%, from about 50 to about 85%, from about 55 to about 80%, from about 60 to about 75%, or even from about 65 to about 70% of the surface area of the user-facing surface of the garment.

Embodiment 12

The garment of any of Embodiments 1-11, wherein the garment is characterized as an activewear garment, a workwear garment, a sleepwear garment, an undergarment, an outerwear garment, a hosiery garment, or any combination thereof. The present technology is especially well-suited to activewear and workwear applications, as workers and active individuals have particular comfort needs; in some cases, users may wish to transfer heat away from themselves; in other cases, a user may wish to retain heat and warmth. As described elsewhere herein, the presently-disclosed garments may provide thermal regulation by retaining heat as needed while also removing heat when needed as well via a dual mechanism.

Exemplary activewear garments include, without limitation, jerseys, shorts, compression-type garments (including shorts, sleeves, and shirts/tops), tank tops, socks, hats, sweatbands, wristbands, sleeves, knee and other joint braces, gloves, shirts, jackets, vests, and the like. Exemplary workwear garments include, e.g., work pants (e.g., chaps), work shirts, boots, hats, sleeves, vests (including protective and high-visibility vests), and the like.

Hosiery garments are also well-suited for use with the disclosed technology. Likewise, undergarments are well-suited for use with the disclosed technology, as wearers of such garments may find themselves in hot environments or active situations where a cooling undergarment would be especially welcome. Undershirts are an especially suitable application for the disclosed technology.

Embodiment 13

The garment of any of Embodiments 1-12, wherein the garment is characterized as pants or a shirt.

It should be understood that a garment may include a region that is fabricated according to the present disclosure, e.g., a shirt in which the torso includes a heat-collecting coating and a fibrous textile base that includes a thermally-conductive additive, but in which the sleeves of the shirt do not include such features. In some embodiments, the entirety of a garment is fabricated according to the present disclosure.

Embodiment 14

The garment of any of Embodiments 1-13, wherein the garment is characterized as woven or knitted. Woven garments are considered especially suitable for use with the disclosed technology. The disclosed technology may be, e.g., incorporated into denim garments, such as jeans and denim jackets.

Embodiment 15

The garment of any of Embodiments 1-14, wherein the garment is characterized as non-woven.

The present disclosure also provides methods, the method comprising fabricating a garment according to any of Embodiments 1-15. Suitable garment fabrication methods will be known to those of ordinary skill in the art.

Embodiment 16

A method, comprising: with a fibrous textile base having a first side, a second side, and a thickness defined therebetween, the fibrous textile base comprising at least one thermally-conductive additive disposed within the fibrous textile base; disposing a first region of heat-collecting coating on the first side of the fibrous textile base, the thermally-conductive additive being disposed so as to place the heat-collecting coating into thermal communication with the second side of the fibrous textile base.

The heat-collecting coating may be disposed in place using a variety of techniques that will be known to those of ordinary skill in the art. As some non-limiting examples, a coating may be disposed via hand block printing, perrotine printing, engraved or gravure plate printing, roller, cylinder, or machine printing, stencil printing, screen printing, lamination, padding/dip-padding, spray coating, vapor deposition, or even via digital textile printing.

As described elsewhere herein, a coating may be patterned and may even comprise differently-patterned regions; as previously described, an additive may be incorporated into fiber before or during an extrusion process so that the additive is incorporated into the fiber itself. It should also be understood that the disclosed methods may include disposing a heat-collecting coating on a second side of the fibrous textile base; such a coating may be the same or different from the heat-collecting coating on the first side of the fibrous textile base.

Embodiment 17

The method of Embodiment 16, further comprising forming a garment from the fibrous textile base. Suitable garments are described elsewhere herein; those of ordinary skill will be familiar with methods of forming garments. Garments may be sewn, glued, bonded, or otherwise fabricated from fabric. The heat-collecting coating may be applied to the surface of a garment before the garment is completed (e.g., to a piece of fabric that is a component of the garment), but may also be applied to the garment when the garment is partially-completed or even complete.

Embodiment 18

The method of Embodiment 17, wherein the garment is characterized as an activewear garment, a sleepwear garment, a workwear garment, an undergarment, an outerwear garment, a hosiery garment, or any combination thereof. Suitable such garments are described elsewhere herein.

Embodiment 19

The method of any of Embodiments 17-18, wherein the garment is characterized as pants or a shirt.

Embodiment 20

The method of any of Embodiments 17-19, wherein the garment is characterized as woven, non-woven, knitted, or any combination thereof.

What is claimed:

1. A garment, comprising:
a fibrous textile base having a first side characterized as being user-facing, a second side, and a thickness defined therebetween, the fibrous textile base comprising at least one thermally-conductive additive disposed within the fibrous textile base; and
a first region of heat-collecting coating disposed on the first side of the fibrous textile base, the thermally-conductive additive being disposed so as to place the heat-collecting coating into thermal communication with the second side of the fibrous textile base, the heat-collecting coating comprising a plurality of patterned features placed into thermal communication with one another.

2. The garment of claim 1, wherein the fibrous textile base comprises a plurality of thermoplastic fibers, a plurality of rayon fibers, a plurality of cellulosic fibers, protein fibers, co-polymer fibers, aramid fibers, inorganic fibers, carbon fibers, or any combination thereof.

3. The garment of claim 2, wherein the fibrous textile base comprises a polyester, a polyamide, a polypropylene, or any combination thereof.

4. The garment of claim 1, wherein the heat-collecting coating, the thermally conductive additive, or both comprises aluminosilicate, graphene, graphene oxide, boron nitride, carbon nanotubes, carbon nanofibers, a metal, a metal oxide, or any combination thereof.

5. The garment of claim 1, wherein the garment comprises a second region of a heat-collecting coating, the heat-collecting coating of the second region differs from the heat-collecting coating of the first region in composition, in pattern, in thickness, or any combination thereof.

6. The garment of claim 1, wherein the thermally-conductive additive comprises aluminosilicate, graphene, graphene oxide, boron nitride, carbon nanotubes, carbon nanofibers, a metal, a metal oxide, or any combination thereof.

7. The garment of claim 6, wherein the thermally-conductive additive comprises graphene oxide.

8. The garment of claim 1, wherein the garment has
(a) a through-plane thermal conductivity of from about 0.5 W/m*k to about 10 W/m*K, (b), an in-plane thermal conductivity of from about 0.005 W/m*K to about 4 W/m*k, or both (a) and (b).

9. The garment of claim 1, wherein the thermally conductive additive is present at from about 0.5 to about 5 wt % as measured against the weight of the fibrous textile base.

10. The garment of claim 1, wherein the heat-collecting coating represents from about 0.01 to about 40% of the surface area of the first surface of the garment.

11. The garment of claim 1, wherein the garment is characterized as an activewear garment, a sleepwear garment, a workwear garment, an undergarment, an outerwear garment, a hosiery garment, or any combination thereof.

12. The garment of claim 1, wherein the garment is characterized as pants or a shirt.

13. The garment of claim 1, wherein the garment is characterized as woven or knitted.

14. The garment of claim 1, wherein the garment is characterized as non-woven.

15. A method, comprising:
   disposing a first region of heat-collecting coating on a first side of a fibrous textile base in a pattern having interconnected elements that thermally interconnect the pattern, the fibrous textile base having a first side, a second side, and a thickness defined therebetween; and
   dispersing a thermally-conductive additive within the fibrous textile base such that the heat-collecting coating is in thermal communication with the second side of the fibrous textile base.

16. The garment of claim 1, wherein the heat-collecting coating comprising at least one thermally-conductive additive.

17. The garment of claim 1, wherein the heat-collecting coating comprises one or more colorants.

18. The garment of claim 1, wherein the plurality of interconnected elements includes hexagonal elements.

19. The garment of claim 1, wherein a first interconnected element of the plurality of interconnected elements is connected with a first thermally conductive trace to a second interconnected element of the plurality of interconnected elements and is connected with a second thermally conductive trace to a third interconnected element of the plurality of interconnected elements.

20. The garment of claim 19, wherein the second interconnected element is connected to the third interconnected element with a third thermally conducive trace.

21. A garment, comprising:
   a fibrous textile base having a first side characterized as being user-facing, a second side, and a thickness defined therebetween, the fibrous textile base comprising at least one thermally-conductive additive disposed within the fibrous textile base; and
   a heat-collecting coating disposed on the first side of the fibrous textile base, the thermally-conductive additive being disposed so as to place the heat-collecting coating into thermal communication with the second side of the fibrous textile base, the heat-collecting coating being patterned and comprising a plurality of interconnected elements, the heat-collecting coating configured to transfer body heat across the interconnected elements.

* * * * *